United States Patent
Chubach et al.

(10) Patent No.: US 12,501,026 B2
(45) Date of Patent: Dec. 16, 2025

(54) METHOD AND APPARATUS FOR LOW-LATENCY TEMPLATE MATCHING IN VIDEO CODING SYSTEM

(71) Applicant: MediaTek Singapore Pte. Ltd., Singapore (SG)

(72) Inventors: Olena Chubach, San Jose, CA (US); Chun-Chia Chen, Hsinchu (TW); Man-Shu Chiang, Hsinchu (TW); Tzu-Der Chuang, Hsinchu (TW); Ching-Yeh Chen, Hsinchu (TW); Chih-Wei Hsu, Hsinchu (TW); Yu-Wen Huang, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 34 days.

(21) Appl. No.: 18/684,792

(22) PCT Filed: Aug. 12, 2022

(86) PCT No.: PCT/CN2022/112149
§ 371 (c)(1),
(2) Date: Feb. 19, 2024

(87) PCT Pub. No.: WO2023/020390
PCT Pub. Date: Feb. 23, 2023

(65) Prior Publication Data
US 2024/0357083 A1  Oct. 24, 2024

Related U.S. Application Data

(60) Provisional application No. 63/234,731, filed on Aug. 19, 2021.

(51) Int. Cl.
H04N 19/105 (2014.01)
H04N 19/167 (2014.01)
(Continued)

(52) U.S. Cl.
CPC ......... *H04N 19/105* (2014.11); *H04N 19/167* (2014.11); *H04N 19/176* (2014.11); *H04N 19/521* (2014.11); *H04N 19/543* (2014.11)

(58) Field of Classification Search
CPC .. H04N 19/105; H04N 19/167; H04N 19/176; H04N 19/51; H04N 19/521; H04N 19/543
See application file for complete search history.

(56) References Cited

U.S. PATENT DOCUMENTS

| | | | |
|---|---|---|---|
| 11,575,927 | B2 | 2/2023 | Jung et al. |
| 11,616,945 | B2 | 3/2023 | Zhang et al. |

(Continued)

FOREIGN PATENT DOCUMENTS

| | | |
|---|---|---|
| CN | 101860754 A | 10/2010 |
| CN | 111083484 A | 4/2020 |

(Continued)

OTHER PUBLICATIONS

International Search Report and Written Opinion dated Nov. 10, 2022, issued in applicaton No. PCT/CN2022/112149.

(Continued)

*Primary Examiner* — Anner Holder
(74) *Attorney, Agent, or Firm* — McClure, Qualey & Rodack, LLP (57) ABSTRACT

A method and apparatus for video coding system that utilizes low-latency template-matching motion-vector refinement are disclosed. According to this method, a current template for a current block is determined, where the current template includes an inside current template including inside prediction samples or inside partially reconstructed samples inside the current block. The inside partially reconstructed samples are derived by adding a DC value of the current block to the inside prediction samples. Corresponding can- (Continued)

didate reference templates associated with the current block are determined at a set of candidate locations. A location of a target reference template among the candidate reference templates that achieves a best match between the current template and the candidate reference templates is determined. An initial motion vector (MV) is then refined according to the location of the target reference template.

21 Claims, 7 Drawing Sheets

(51) Int. Cl.
  *H04N 19/176* (2014.01)
  *H04N 19/513* (2014.01)
  *H04N 19/543* (2014.01)

(56) References Cited

U.S. PATENT DOCUMENTS

| | | | |
|---|---|---|---|
| 11,641,467 | B2 | 5/2023 | Liu et al. |
| 11,889,108 | B2 | 1/2024 | Liu et al. |
| 2012/0044996 | A1 | 2/2012 | Sato |
| 2017/0353719 | A1 | 12/2017 | Liu |
| 2020/0068218 | A1 | 2/2020 | Chen et al. |
| 2020/0221110 | A1 | 7/2020 | Chien et al. |
| 2020/0374513 | A1* | 11/2020 | Xiu ................ H04N 19/64 |
| 2022/0224915 | A1 | 7/2022 | Wang |
| 2022/0295088 | A1 | 9/2022 | Zhang |
| 2022/0295089 | A1* | 9/2022 | Zhang .............. H04N 19/52 |

FOREIGN PATENT DOCUMENTS

| | | |
|---|---|---|
| CN | 111083491 A | 4/2020 |
| CN | 111919449 A | 11/2020 |
| TW | 201811043 A | 3/2018 |
| TW | 202037159 A | 10/2020 |
| WO | 2019/225932 A1 | 11/2019 |
| WO | 2020/005002 A1 | 1/2020 |

OTHER PUBLICATIONS

Chinese language office action dated Aug. 8, 2023, issued in application No. TW 111130916.

International Search Report and Written Opinion dated Nov. 17, 2022, issued in applicaton No. PCT/CN2022/112147.

Chinese language office action dated Sep. 5, 2023, issued in application No. TW 111130915.

* cited by examiner

METHOD AND APPARATUS FOR LOW-LATENCY TEMPLATE MATCHING IN VIDEO CODING SYSTEM

CROSS REFERENCE TO RELATED APPLICATIONS

The present invention is a non-Provisional Application of and claims priority to U.S. Provisional Patent Application No. 63/234,731, filed on Aug. 19, 2021. The U.S. Provisional Patent Application is hereby incorporated by reference in its entirety.

TECHNICAL FIELD

The present invention relates to video coding system. In particular, the present invention relates to reducing the latency of the template matching coding tool in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

Figure 1A:
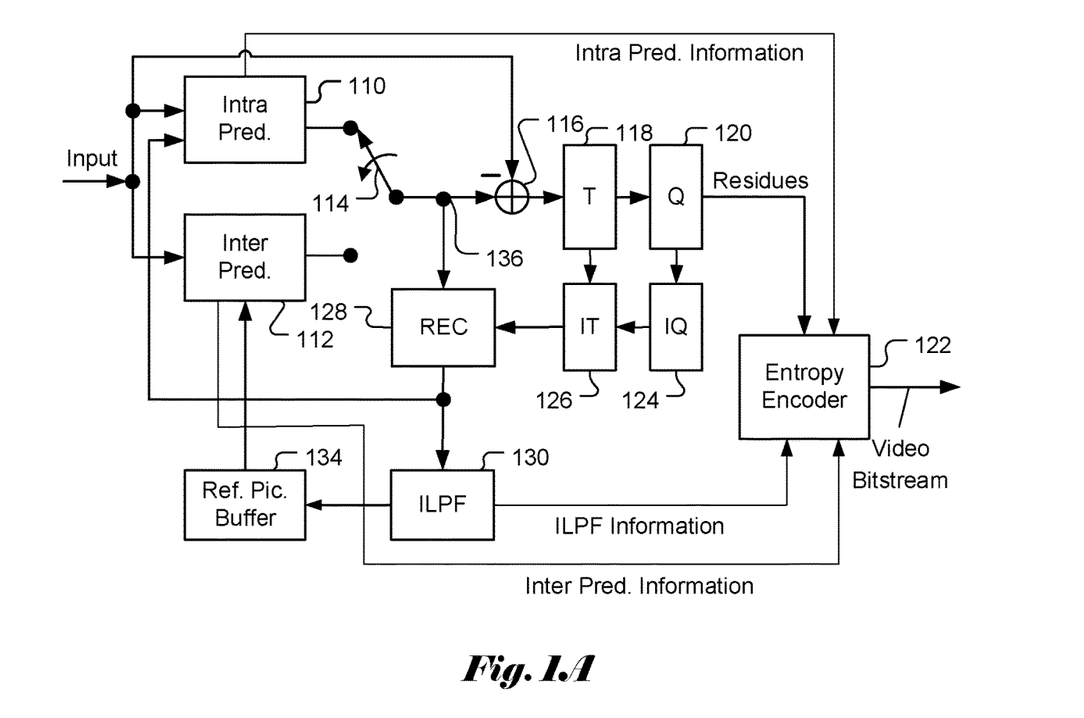
FIG. 1A illustrates an exemplary adaptive Inter/Intra video coding system incorporating loop processing.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

Figure 1B:
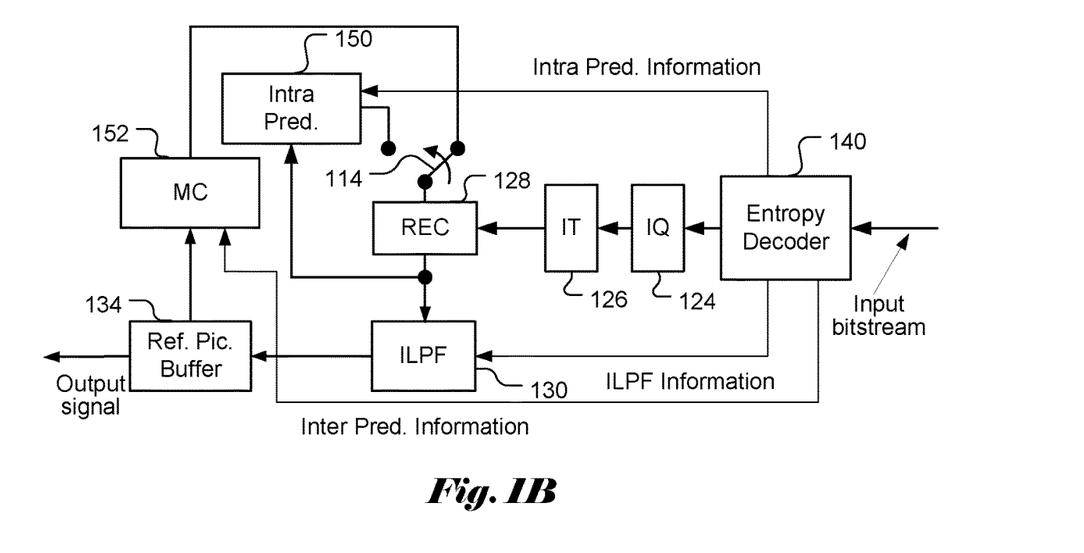
FIG. 1B illustrates a corresponding decoder for the encoder in FIG. 1A.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g., ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some have been adopted by the standard and some are not. Among the new coding tools, a technique, named Template Matching, to derive the motion vector (MV) for a current block is disclosed. The template matching is briefly reviewed as follows.

Template Matching (TM)

Figure 2:
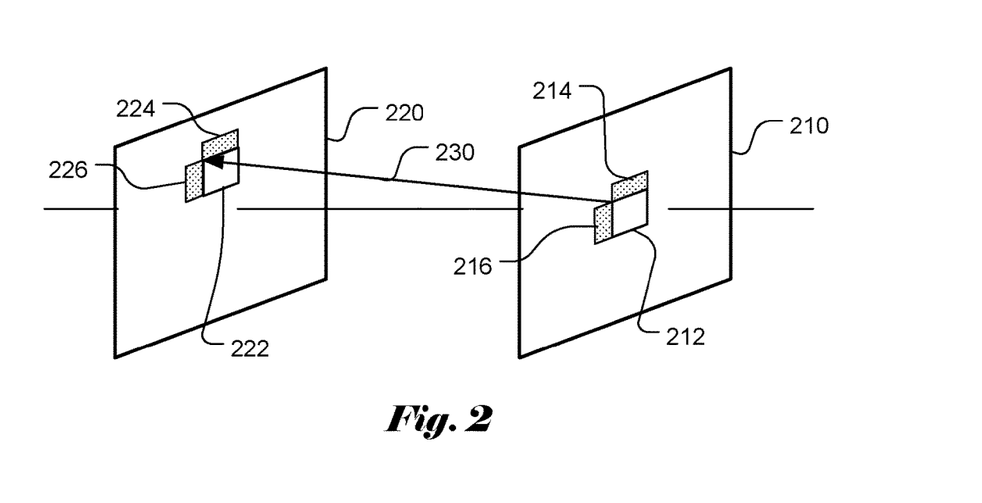
FIG. 2 illustrates an example of template matching, where rows of pixels above the current block and the reference block and columns of pixels to the left of the current block and the reference block are selected as the templates.

Template matching (TM) has been proposed for VVC in JVET-J0021 (Yi-Wen Chen, et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-j0021). Template Matching is a decoder-side MV derivation method to refine the motion information of the current CU by finding the closest match between a template (i.e., top and/or left neighbouring blocks of the current CU) in the current picture and a block in a reference picture as illustrated in FIG. 2. In FIG. 2, rows of pixels 214 above current block and columns of pixels 216 to the left of the current block 212 in the current picture 210 are selected as the template. The search starts from an initial position (as identified by the initial MV 230) in the reference picture. Corresponding rows of pixels 224 above the reference block 222 and columns of pixels 226 to the left of the reference block 222 in the reference picture 220 are identified as shown in FIG. 2. During the search, the same "L" shape reference pixels (i.e., 224 and 226) in different locations are compared with the corresponding pixels in the template around the current block. The location with minimum matching distortion is determined after the search. At this location, the block that has the optimal "L" shape pixels as its top and left neighbours (i.e., the smallest distortion) is selected as the reference block for the current block.

Since the template matching based refinement process is performed at both the encoder side and the decoder side, therefore the decoder can derive the MV without the need of signalled information from the encoder side. The Template Matching process derives motion information of the current block by finding the best match between a current template (top and/or left neighbouring blocks of the current block) in the current picture and a reference template (same size as the current template) in a reference picture within a local search region with search range [−8, 8] integer-pixel precision.

When TM is applied in AMVP (Advanced Motion Vector Prediction) or Merge mode, an MVP (Motion Vector Prediction) candidate is determined based on the initial template matching error to pick up the one which reaches the minimum difference between the current block and the reference block templates, and then TM performed only for this particular MVP candidate for MV refinement (i.e., local search around the initial MVP candidate). AMVR (Adaptive Motion Vector Resolution) mode uses different resolutions to encode MVDs for bitrate saving. AMVR mode supports luma MV resolutions for translation at quarter-sample, half-sample, integer-sample, and 4-sample. Furthermore, AMVR mode supports luma MV resolutions for affine at quarter-sample, 1/16-sample, and integer-sample. AMVR in VVC is applied at CU level. The decoded MVDs are interpreted with different resolutions based on AMVR information and stored with 1/16-sample precision in internal buffer. TM refines this MVP candidate, starting from full-pel MVD (Motion Vector Difference) precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by AMVR mode after TM process.

TABLE 1

Search patterns of AMVR and merge mode with AMVR.

| Search pattern | AMVR mode | | | | Merge mode | |
|---|---|---|---|---|---|---|
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | | v | |

In the merge mode, a similar search method is applied to the merge candidate indicated by the merge index. As shown in Table 1, TM may be performed all the way down to the 1/8-pel MVD precision or skip those beyond the half-pel MVD precision, depending on whether the alternative interpolation filter (that is used when AMVR is of half-pel mode) is used (as indicated by AltIF) according to merge motion information. Besides, when TM mode is enabled, template matching may work as an independent process or an extra MV refinement process between block-based and subblock-based bilateral matching (BM) methods, depending on whether BM can be enabled or not according to its enabling condition check. When DMVR (Decoder-Side Motion Vector Refinement) and TM are both enabled for a CU, the search process of TM stops at the half-pel MVD precision and the resulted MVs are further refined by using the same model-based MVD derivation method as in DMVR.

According to the conventional TM MV refinement, if a current block uses the refined MV from a neighbouring block, this may cause a serious latency problem. Therefore, there is a need to resolve the latency problem and/or to improve the performance of TM refinement process.

BRIEF SUMMARY

A method and apparatus for video coding system that utilizes low-latency template-matching motion-vector refinement are disclosed. According to this method, input data comprising a plurality of blocks of a video unit in a current picture are received. A current template for a current block of the plurality of blocks is determined. When the current block corresponds to a first target block, the current template includes an inside current template comprising inside prediction samples or inside partially reconstructed samples inside the current block on a top side, a left side, or both the top side and the left side of the current block. The inside partially reconstructed samples are derived by adding a DC value of the current block to the inside prediction samples. Candidate reference templates associated with the current block at a set of candidate locations in a reference picture are determined, where each candidate reference template corresponds to the current template at one corresponding candidate location. A location of a target reference template among the candidate reference templates that achieves a best match between the current template and the candidate reference templates is determined. An initial motion vector (MV) is then refined according to the location of the target reference template.

In one embodiment, the inside prediction samples are obtained from the reference picture according to the initial MV and a current location of the current block.

In one embodiment, the first target block corresponds to one of the plurality of blocks that has at least one neighbouring block with reconstructed samples not fully available.

In one embodiment, when the current block corresponds to a second target block, the current template includes an outside current template comprising outside reconstructed samples outside the current block on the top side, the left side, or both the top side and the left side of the current block. The current block can be designated as the first target block or the second target block depending on a condition. For example, the condition may correspond to that the current block has at least one neighbouring block with reconstructed samples not fully available. The current block is designated as the first target block if the condition is satisfied; and otherwise, the current block is designated as the second target block.

In one embodiment, when the current block corresponds to the second target block, the current template corresponds to the outside current template. In another embodiment, when the current block corresponds to the second target block, the current template corresponds to a combination of the inside current template and the outside current template.

In one embodiment, the first target block corresponds to one of the plurality of blocks that has one latest reconstructed neighbouring block.

In one embodiment, when the current block corresponds to the first target block, each candidate reference template includes an inside candidate reference template corresponding to the inside current template at said one corresponding candidate location. A low-pass filter may be applied to each candidate reference template. The current template may further include an outside current template comprising outside samples outside the current block on the top side, the left side, or both the top side and the left side of the current block. Furthermore, the outside samples may correspond to prediction samples outside the current block. Each candidate reference template may comprise an outside candidate reference template corresponding to the outside current template at one corresponding candidate location.

A matching error or cost between the current template and one candidate reference template can be determined according to an outside matching error or cost between the outside current template and the outside candidate reference template and an inside matching error or cost between the inside current template and the inside candidate reference template. In one embodiment, the matching error or cost corresponds to a weighted sum of the outside matching error or cost and the inside matching error or cost. One or more weights for the weighted sum can be dependent on a prediction mode, block size or partition type of the current block.

In one embodiment, the current template excludes the inside current template if a neighbouring block of the current block uses MTS (Multiple Transform Selection) coding tool.

In one embodiment, the DC value is derived as an average of prediction samples of the current block.

DETAILED DESCRIPTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

As mentioned earlier, the TM refinement process requires to access the reference data for the templates. Furthermore, according to the conventional TM MV refinement, if a current block uses samples from a neighbouring block to obtain the refined MV, this may cause a serious latency problem. Therefore, there is a need to resolve the latency problem and/or to improve the performance of TM refinement process. In order to solve this issue, low-latency TM searching methods as well as an improved TM search method disclosed as follow.

Using L-Shape of the Predefined Region for Obtaining the Template

The predefined region can be generated by partitioning one picture/slice/CTU into multiple non-overlapping regions. In one embodiment, the predefined region coincides with Virtual Pipeline Data Unit (VPDU), where the VPDU is a block unit in a picture that needs to be held in memory for processing while decoding. In one embodiment, the predefined region is a rectangular/square area containing one or more VPDUs. In one embodiment, the predefined region is a rectangular/square area containing one or more CUs. In one embodiment, the predefined region is a CTU, in another embodiment, the predefined region is the upper CTU-row boundary, meaning that the L-shape template (also referred as L-shape) only uses the boundary neighbouring pixels from the upper CTU-row.

Figure 3A:
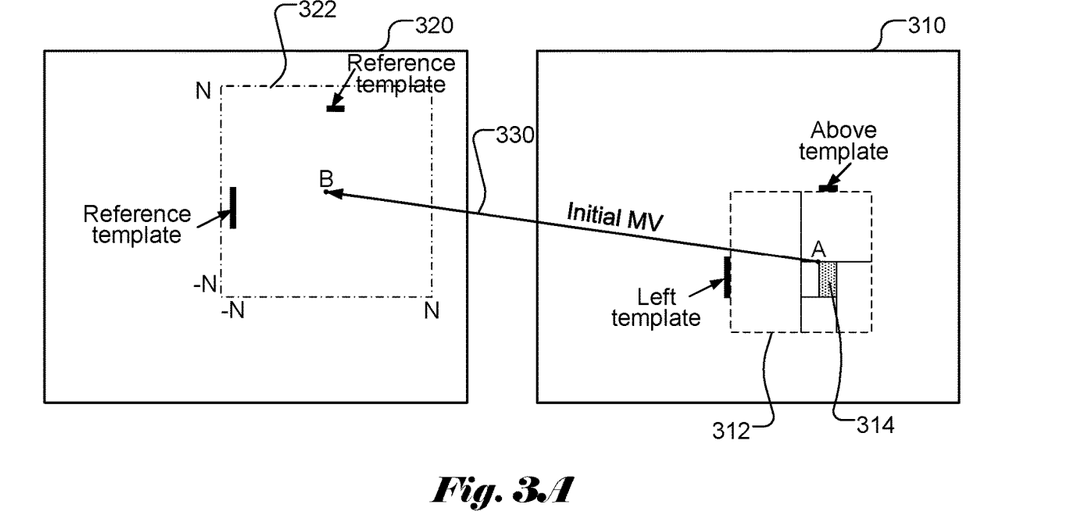
FIG. 3A-B illustrate examples of L-shape template from a pre-defined region according to embodiments of the present invention.
Figure 3B:
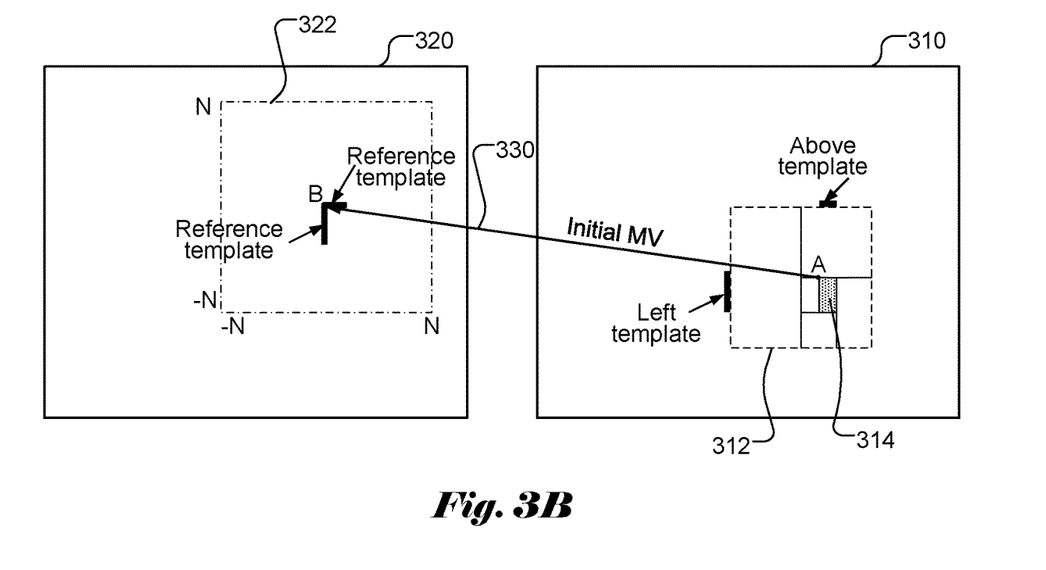

In the present invention, for refinement of the current CU's MV, instead of using the elements from the top and/or left neighbouring blocks of the current CU ($CU_c$) to generate the template, it uses the elements of the top and/or left neighbouring blocks of the current CU's predefined region. FIG. 3A and FIG. 3B show examples of the proposed approach, where the current CU 314 is in the current frame 310, an initial MV 330 points from a point A in the current frame to point B in a reference frame 320, the predefined region 312 is marked with dashed lines, and above and left templates are marked with bold lines. A better MV is to be searched around a location (i.e., point B) pointed by the initial motion vector of the current CU within a [−N, +N]-pel search range 322. In one embodiment, the above and left reference templates in the reference frame are located at the same distance from each other as those in the current frame; and at the same distance from the initial search point (i.e., point B) in the reference frame as the above and left template from the top-left point (i.e., point A) of the $CU_c$ (see FIG. 3A). In another embodiment, the reference template in the reference frame is located at the top and left from the position (point B) where the initial MV is pointing in the reference frame (see FIG. 3B).

The outer-L-shape in the current frame does not necessarily have to be aligned with the horizontal and/or vertical corresponding position relative to the position of the current CU, as it is shown in FIGS. 3A-B. It can also be at other positions in the predefined boundingBox, where only the reference data inside the boundingBox are used to generate the L-shape template. In one embodiment, the outer box L-shape can be on the left-top corner on the VPDU.

In another method, it is proposed to use a combination (e.g. linear combination or filtering (e.g. interpolation)) of the neighbouring pixels from the outer box (predefined region), to generate a "fake" L-shape for the current CU. For example, in FIG. 3A, we can apply some operation to the Above template and Left template to generate a fake L-shape for the top/left neighbouring pixels for $CU_c$. The term, fake L-shape in this disclosure refers to the L-shape that uses derived samples instead of actual samples at locations of the L-shape. In another example, we can use all the top/left neighbouring pixels in the predefined region to generate the fake neighbouring pixels of the $CU_c$. For example, in FIG. 3A, if the size of $CU_c$ is equal to 8×16, the predefined region is 128×128. We can use 128×M top neighbouring pixels and K×128 left pixels with different weights and/or apply some filtering to generate the 16 left fake neighbouring and 8 top "fake" neighbouring pixels for $CU_c$. Here M and K can be any non-negative integers greater than or equal to 1.

Using Parent-Node's L-Shape for Obtaining the Template

Figure 4A:
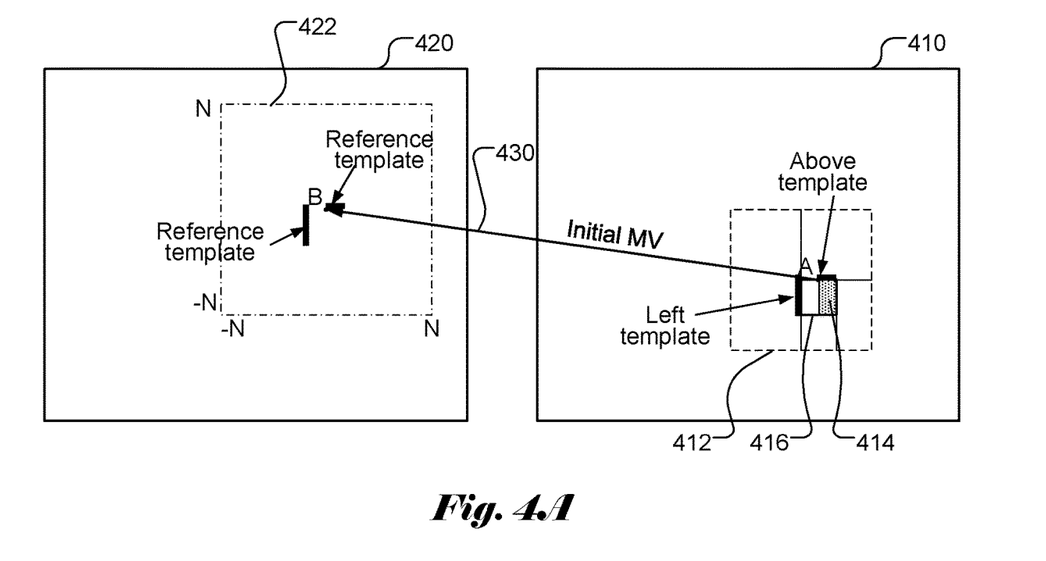
FIG. 4A-B illustrate examples of L-shape template from a parent node of the current block according to embodiments of the present invention.
Figure 4B:
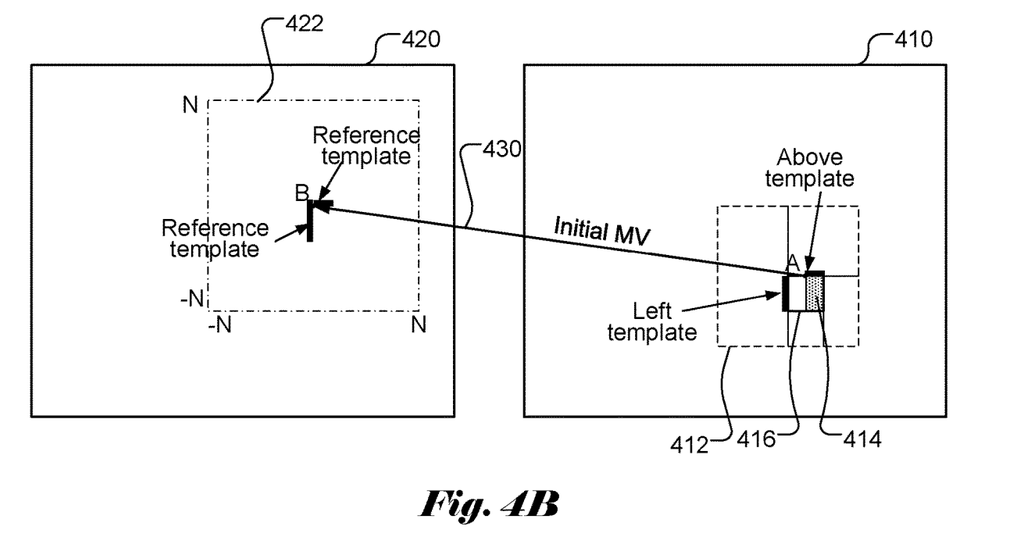

In this embodiment, for refinement of the current CU's MV, instead of using the elements from the top and/or left neighbouring blocks of the current CU ($CU_c$) to generate the template, it uses elements from the top and/or left neighbouring blocks of the direct parent of the current CU for the match elements to generate the template. FIG. 4A and FIG. 4B show examples of the proposed approach, where the current CU 414 is partitioned from a parent node 416 in the current frame 410, an initial MV 430 points from a point A in the current frame to point B in a reference frame 420, the VPDU 412 is marked with dashed lines, and above and left templates of the parent node are marked with bold lines. A better MV is to be searched around a location (i.e., point B) pointed by the initial motion vector of the current CU within a [−N, +N]-pel search range 422. Above and Left templates are marked with bold lines. A better MV is to be searched around a location (point B) pointed by the initial motion vector of the current CU within a [−N, +N]-pel search range 422. In one embodiment, the above and left reference templates in the reference frame are located at the same distance from each other as those in the current frame; and at the same distance from initial search point B in the reference frame as the above and left template from the top-left point A of the CU (see FIG. 4A). In another embodiment, the reference template in the reference frame is located at the top and left from the position where the initial MV is pointing in the reference frame (see FIG. 4B).

Figure 4C:
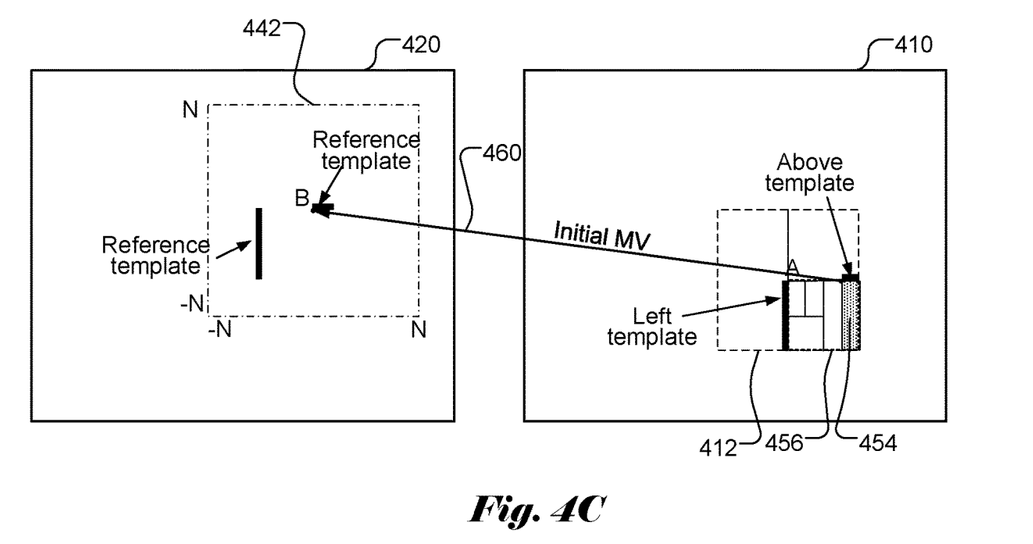
FIG. 4C-D illustrate other examples of the proposed methods.
Figure 4D:
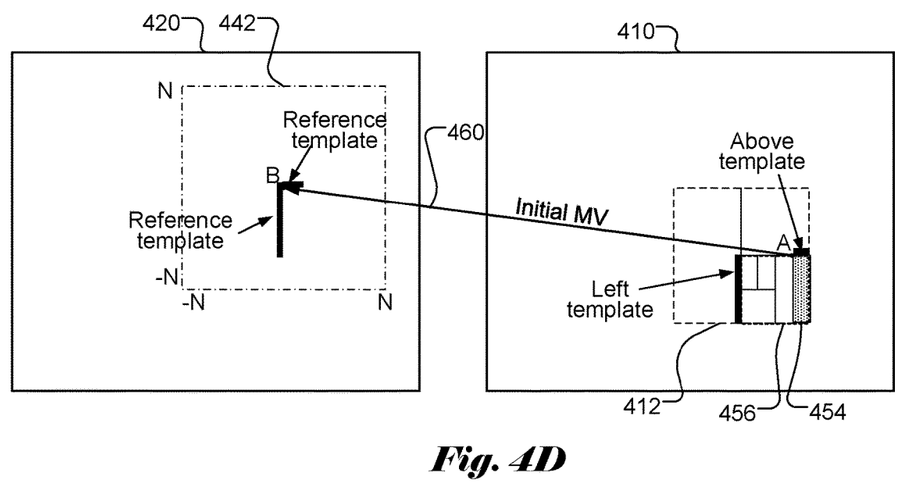

In another embodiment, it uses elements from the top and/or left neighbouring blocks of the grand-parent (or higher level parent node) of the current CU for the match elements. FIG. 4C and FIG. 4D show examples of the proposed approach, where the current CU 454 is partitioned from a grand-parent node 456. A better MV is to be searched around a location pointed by the initial motion vector 460 of the current CU 454 within a [−N, +N]-pel search range 442. In one embodiment, the Above and Left reference templates in the reference frame 420 are located at the same distance from each other as those in the current frame 410; and at the same distance from initial search point B in the reference frame as the Above and Left template from the top-left point A of the $CU_c$ (see FIG. 4C). In another embodiment, the reference template in the reference frame 420 is located at the top and left from the position B where the initial MV is pointing in the reference frame (sec FIG. 4D).

Adaptive L-Shape

In the original TM design, in order to obtain the templates for the current CU, all the CUs above and on the left of the current CU must be fully reconstructed. This creates certain processing latency when TM is enabled. A method to reduce this latency is disclosed as follows. According to embodiments of this invention, instead of using both above and left templates (when available), it switches between multiple templates based on partitioning and/or processing order. In one embodiment, it adaptively uses left-only, above-only or original above and left templates, depending on the partitioning of the parent node and/or processing order.

Figure 5A:
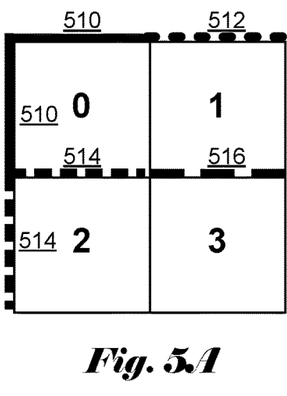
FIG. 5A-C illustrate examples of adaptive L-shape template according to embodiments of the present invention.
Figure 5B:
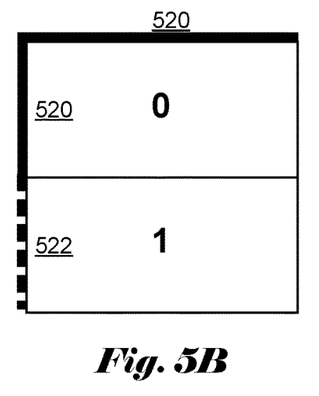

In another embodiment, instead of directly discarding the left or top neighbouring pixels according to the CU order, we can still use prediction pixels (not fully reconstructed) from the previously decoded CU. For example, in FIG. 5B, CU1 can use the prediction result 520 of CU0, (not the fully reconstructed result) for TM. This allows to reduce the latency, while still using above and left templates for TM.

In one embodiment, if the parent node is partitioned with quaternary tree or quadtree (QT) (see FIG. 5A), then above and left templates 510 are used for sub-block 0, only top template 512 is used for sub-block 1, above and left templates 514 are used for sub-block 2, and only top template 516 is used for sub-block 3.

In one embodiment, if a parent node is partitioned with horizontal binary tree (HBT) partitioning (see FIG. 5B), then above and left templates 520 are used for sub-block 0, and left only template 522 is used for sub-block 1. This way, a processing latency of only 1 CU is preserved in case of QT/BT. The proposed method can be extended to the ternary tree (TT) in a similar manner.

Figure 5C:
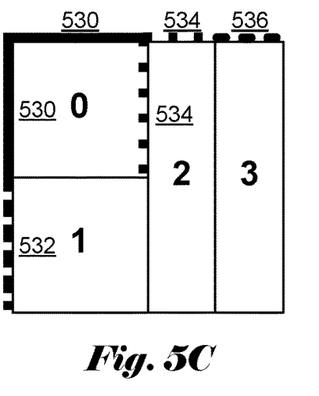

In one embodiment of the present invention, it is suggested to account not only for a direct parent node's partitioning and/or processing order but also for multiple previous steps back. In one embodiment, a node is partitioned with vertical binary tree (VBT) partitioning, followed by horizontal binary tree (HBT) partitioning of the left sub-block and VBT partitioning of the right sub-block (see FIG. 5C). In this case, the delay is also one CU. Accordingly, CU0 is using the traditional TM (both, above and left templates 530 if available); CU1 is using only left template 532 (since the target is to have a delay of one CU, samples from CU0 are not used); CU2 is using samples from the top and half of the left template 534 (again, to keep processing latency of one CU, samples from the CU1 not used for the template); and CU3 is using only samples from the top 536 to preserve the one CU latency, samples from CU2 not used for the left template of CU3).

In one embodiment, if the neighbouring pixels of the current L-shape (of the current CU) are located only in the previous CU (in decoding order), we can either discard these pixels (i.e., not using them in the L-shape), or use the prediction samples instead (i.e., not the fully reconstructed ones).

In one embodiment of the present invention, the limitation is modified as follows: do not use samples from the previous N CUs, with the coding order preceding to the current CU, where N can be any number from 1 to the current CU's depth.

In another embodiment, it skips elements from N CUs with the same (or >=) level/depth as the current CU, where N can be any number greater than zero. In one embodiment, it does not use elements from any CU with the same or larger QT/MTT (Multi-Type Tree)-depth, as the current CU's QT/MTT depth.

In one embodiment, the limitation is depending on the area of one or more of the previously coded CUs. In one embodiment, the limitation is as follows: do not use elements from a certain area of the CUs preceding to the current CU in the coding order; if the previously coded CUs are too small (e.g., area<=M), then skip one or more than one previously coded CUs, until the threshold "delay" reaches M or a value higher than M. In one embodiment, the threshold (M) is equal to 1024 samples, so any of the elements from the CUs coded earlier than 1024 samples ago will not be allowed for use in TM. In another embodiment, samples from any CU with the area smaller than a threshold are not considered for TM.

Multiple L-Shape Options

Figure 6:
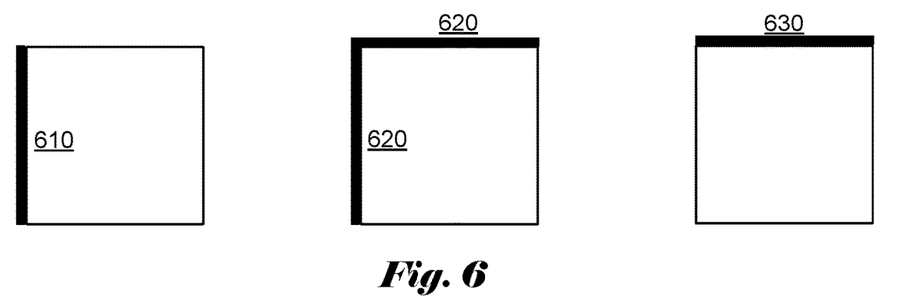
FIG. 6 illustrates examples of multiple templates according to an embodiment of the present invention, where left-only template, above-only template and left-and-above template are used.

In the original design of TM, both above and left templates are always used, if available. However, using both above and left templates is not always necessary, since sometimes using only above or only left template can provide a better TM result than the original design. Thus, it may happen that using top+ left templates is not necessary and for some CUs using only top/left is better (see FIG. 6). In FIG. 6, template 610 corresponds to the left-only template, template 620 corresponds to the left-and-above template, and template 630 corresponds to the above-only template. For example, if two neighbouring CUs come from different objects in a scene and have different motions, then using elements from a neighbouring CU for TM may not provide accurate results. In this case, using template only from the other (e.g. above CU) may be preferable.

In one embodiment, all three options are checked at the encoder, and the best option is signalled to the decoder. In another embodiment, both encoder and decoder will check all three options, and in this case no additional signalling is required.

In one embodiment, the selection of the L-shape top/left can be implicitly turned on/off according to the CU-size, CU-shape or surrounding information.

In one embodiment, the rule for discarding left or top neighbouring pixels can also depend on the aspect ratio between the CU width and the CU height. For example, if the CU is very wide in the horizontal direction and very narrow in the vertical direction (i.e., width much greater than height), then we prefer to use more top-only neighbouring samples.

In one embodiment, result of each of the three templates is combined with an internal reconstructed area and then the decision is made.

In another embodiment, the refined results of three templates are further combined to form the final results. In one embodiment, the weights depend on the cost calculated during the TM process, or weights are predefined, or some predefined filtering process (e.g. bi-lateral filtering) is used.

In one embodiment, we can directly average (results with equal or non-equal weights) the three refined MVs obtained with three different templates (i.e., above only, left-only and L-shape) respectively. In another embodiment, we need to perform three times of MC and then average (with equal or non-equal weights) the MC results.

In another embodiment, the above, left, or above+left template is selected adaptively according to MV similarity between the current MV and MVs of neighbouring CUs. For example, if the MV of the current CU is similar to the MV from the top CU but very different from the MV of the left CU, do not include the template from the left CU; but only use the template from the top CU; and if all MVs are similar, use both templates.

In another embodiment, the template selection can be performed according to the coding mode (e.g. intra/inter mode) of neighbouring CU. For example, if the top neighbouring CU is majorly the intra mode, then the top neighbouring pixels will not be included in the L-shape template.

In another embodiment, the template selection can be done according to the splitting of the neighbouring CUs. For example, if the above neighbouring part contains many small CUs, then, this edge tends to be not accurate for the L-template; therefore, it is better to discard it.

In another embodiment, the decoder can perform some on-the-fly edge detection on top and/or left neighbouring pixels for helping to decide whether to use left and/or top samples for the L-shape template. For example, if the left neighbouring samples show a strong edge, then, the left neighbouring pixels are most probably not accurate for the L-shape template, and therefore, the left part of the L-shape template can be partially or fully discarded.

Use Prediction Samples as the Template for TM

Another approach to reduce latency in TM has been disclosed in JVET-J0045 (X. Xiu, et al., "On latency reduction for template-based inter prediction", Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0045). In particular, it proposes to form the template samples by summing up a prediction signal of the spatial neighbouring blocks of the current CU (which is less accurate than the fully reconstructed signal used in the original TM design) and the reconstructed DC component of the spatial neighbouring blocks of the current CU. Given that the reconstruction of the DC can be easily done by de-quantizing the transform coefficient at the lowest frequency, and the DC coefficient is available right after parsing, without applying the full inverse quantization and inverse transform process. Thus, such method would not increase the decoding latency of TM.

In the current invention, a new type of template is disclosed by combining two templates for TM.

Figure 7:
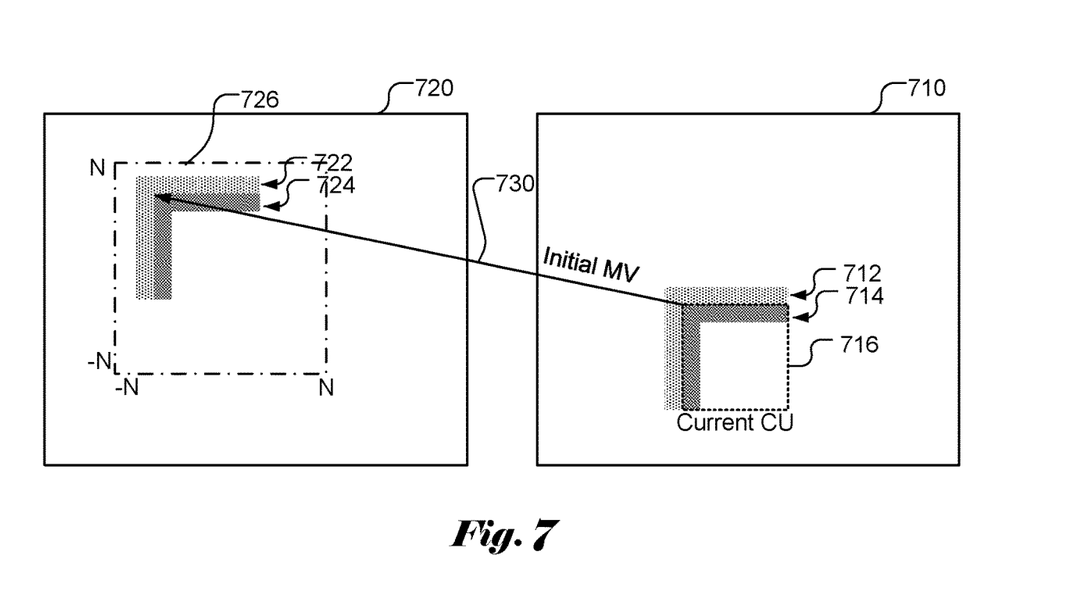
FIG. 7 illustrates an example of adaptively using inside template, outside template or both according to embodiments of the present invention.

In one embodiment, Template 1 (reference template 724 and current template 714 in FIG. 7)—constructed by adding DC value to the reconstructed prediction samples of the current CU (obtained using initial MV). This way, no need to wait for the full reconstruction of the neighbouring samples and the latency can be reduced; but we still need to wait for a DC value. Template 1 is also referred as inside template in this disclosure. In another embodiment, Template 1 (reference template 724 and current template 714 in FIG. 7) is constructed by adding DC value to the reconstructed prediction samples of the spatial neighbouring blocks. Also, the derivation of Template 1 (i.e., template 714 and 724) can be done by adding DC value to the prediction samples. Furthermore, the derivation of Template 1 by adding DC value to the prediction samples doesn't have to be done for both template 714 and template 724. For example, template 714 can be derived by adding DC value to the prediction samples while template 724 is derived using fully reconstructed samples. Therefore, there is no need to wait for the full reconstruction of the neighbouring samples and the latency can be reduced; but we still need to wait for a DC value.

In one embodiment, Template 2 (reference template 722 and current template 712 in FIG. 7) corresponds to additional reconstructed prediction samples from above and left sides of the current CU. Since there is no need to wait for full reconstruction, no latency is introduced at this step either. Template 2 is also referred as outside template in this disclosure.

By combining two templates (i.e., "prediction" template from above and left (also referred as outside template) and "prediction+DC" template from inside), the latency can be avoided. At the same time, since there are more samples used for TM, the precision of the TM should be increased.

In one embodiment, using a "prediction" and "DC+prediction" samples for TM is combined with the current TM design. In one embodiment it is proposed to adaptively use "normal/fully reconstructed" template for earlier CUs (i.e., those reconstructed earlier) and use "predictor" option (Template 1, marked with bold line) (with or without DC) for those CUs which come later. In one embodiment, the approach is as follows: if the neighbouring block is the last reconstructed CU, then use "DC+prediction" samples for TM; otherwise, use "normal/fully reconstructed" template for TM.

In another embodiment, both versions, Template 1 and Template 2 (or "normal/fully reconstructed" template instead of Template 2) are either used separately or jointly, depending on certain conditions (e.g. depending on encoding/decoding order). In another embodiment, Template 2 (or "normal/fully reconstructed" template instead of Template 2) can be skipped for certain blocks, and only Template 1 (or Template 2 instead of Template 1) is used in this case. In yet another embodiment, the Template is derived by combining Template 1 and Template 2 differently for the top and left parts. For example, we can use Template 1+Template 2 for the top part and only use Template 1 (or Template 2) for the left part.

In one embodiment, it applies different weighting coefficients to Template 1 and Template 2. In one embodiment, different weights are used for "prediction" and "DC+prediction", which can be decided based on the prediction mode (e.g., inter/intra/IBC/affine), block size, partitioning, etc.

In one embodiment, the average of all coefficients can be used instead of DC coefficients. It can be obtained after parsing all the coefficients (similar to DC).

In one embodiment, it drops MTS (Multiple Transform Selection) for Inter predicted CUs when TM is applied. In other words, when TM is applied, the MTS coding tool is disabled for Inter predicted CUs.

In another embodiment, Template 1 is not used when at least one of the spatial neighbouring blocks use MTS, where the spatial neighbouring blocks are used to form the template. In this case, Template 2 can still be used.

In one embodiment, it is suggested to use padding to obtain missing or unavailable samples for Template 2, e.g. in case if those unavailable samples are from the CU coded with Intra mode This way, Inter and Intra coded CUs can be encoded/decoded in parallel.

In one embodiment, it applies additional filter to the reference samples. For example, it applies low pass filtering to the reconstructed samples of Template 1, Template 2 or both.

In one embodiment, it stores the reconstruction+DC for all reference frames, and use those instead of the fully reconstructed samples. The reason for such update is that if all the high frequencies are dropped in the template of the current frame, then the proposed modification allows to align the reference frame to the current frame (if Template 1 is used in the current frame).

Boundary+Reconstruction Matching for TM Refinement

The proposed method can be either used to refine the TM result, or used independently to refine MVPs in the current picture. However, it is applied after the regular TM. In the present invention, after obtaining the TM result, it applies a "boundary smoothness" method to refine it at the decoder side, by considering additionally the decoded residual of the current CU sent by an encoder.

In the conventional TM, we use the L-shape template in the current and reference frames to perform matching. In the further proposed refinement, we use N MV refinement candidates (e.g. N=5 or N=9) for performing the boundary smoothness matching. For each of these MV candidates, the MC result is generated first. Each of these MC results is then added to the residual, where the residual is generated at the encoder using the best MV refinement candidate and sent to the decoder. Then, we compare this (MC+residual) to the boundary. The MV candidate that provides the "smoothest boundary condition" is considered the best candidate.

In one embodiment, the boundary smoothness condition is computed as follows: perform MV refinement providing the minimum SAD between one or more pixel lines from above and left of the block and one or more of the top and the left lines of the current CU (result of MC+decoded residual).

At the encoder side: after performing TM, use N refinement candidates and source to obtain the "best" MV refinement satisfying "boundary smoothness condition"; obtain internal PB (Prediction Block) using the MVP and the best refinement and compute the residual signal of the original internal block; and apply DCT/DST/quantization to the residual and send it to the decoder.

At the decoder: perform TM using the MV candidate, then for each of the N refinement positions generate an inner block using the reconstructed reference frame and add the decoded residual. (MVP+refinement+residual) that satisfies the "boundary smoothness condition" is chosen.

In the present invention, an encoder can send a "reordered" index to the decoder in case if the boundary smoothness matching refinement is not expected to provide the best result. For example, at the encoder side, we can use the original video data to find the best candidate A. If the candidate A is actually the best, but another candidate (for example, candidate B) shows a better TM result considering the boundary smoothness condition, then encoder still needs to encode the residual based on candidate A. However, the encoder can reorder the candidate index set according to the boundary smoothness matching result. Then, the decoder can, in the same way, reorder the candidates according to the boundary matching condition; and considering the reordered index sent by encoder, use the same candidate as the encoder (i.e. the real-best candidate defined at the encoder side). In one embodiment, on the encoder side, we use video-source to get a real-best candidate. In this case, the best candidate chosen according to the boundary smoothness condition should match the real-best candidate, and therefore, this method is expected to have coding gain.

In one embodiment of the present invention, internal block matching can be applied to other modes, not only TM (e.g., AMVP, DMVR). For example, when AMVP is applied, sign information can be skipped for MVP. At the decoder, the sign information can be recovered using the TM-based approach mentioned above, where N is equal to 4 (i.e., 4 possible combinations of signs for MVx and MVy components of the MVP).

In another embodiment, this method can replace the bilateral matching in DMVR.

In one embodiment, this method can be used to reorder MVs in the MV list, so the MV which is providing the best prediction is moved to the front of the list and therefore coded with a min index.

In one embodiment, if the MVP refinement is allowed to have the same phase (i.e., having an integer steps between MVP refinements) then N times of MC can be avoided. Thus, the MC result needs to be generated only once for a larger area/box and it is possible to reduce the total number of motion compensations from N to just one MC and use this generated result for obtaining required samples.

In one embodiment, the boundary-matching refinement after the TM refinement can be implicitly turned on/off, according to the initial boundary-smoothness value for the MC result+residual, where the MC result is the first refinement result by TM. In another embodiment, one flag is sent to the decoder, indicating whether to perform the boundary matching.

The template matching can be used as an inter-prediction technique to derive the initial MV. The template matching based MV refinement can also be used to refine an initial MV. Therefore, template matching MV refinement process is considered as a part of inter prediction. Therefore, the foregoing proposed methods related to template matching can be implemented in the encoders and/or the decoders. For example, the proposed method can be implemented in an inter coding module (e.g., Inter Pred. 112 in FIG. 1A) of an encoder, and/or an inter coding module (e.g., MC 152 in FIG. 1B) of a decoder.

Figure 8:
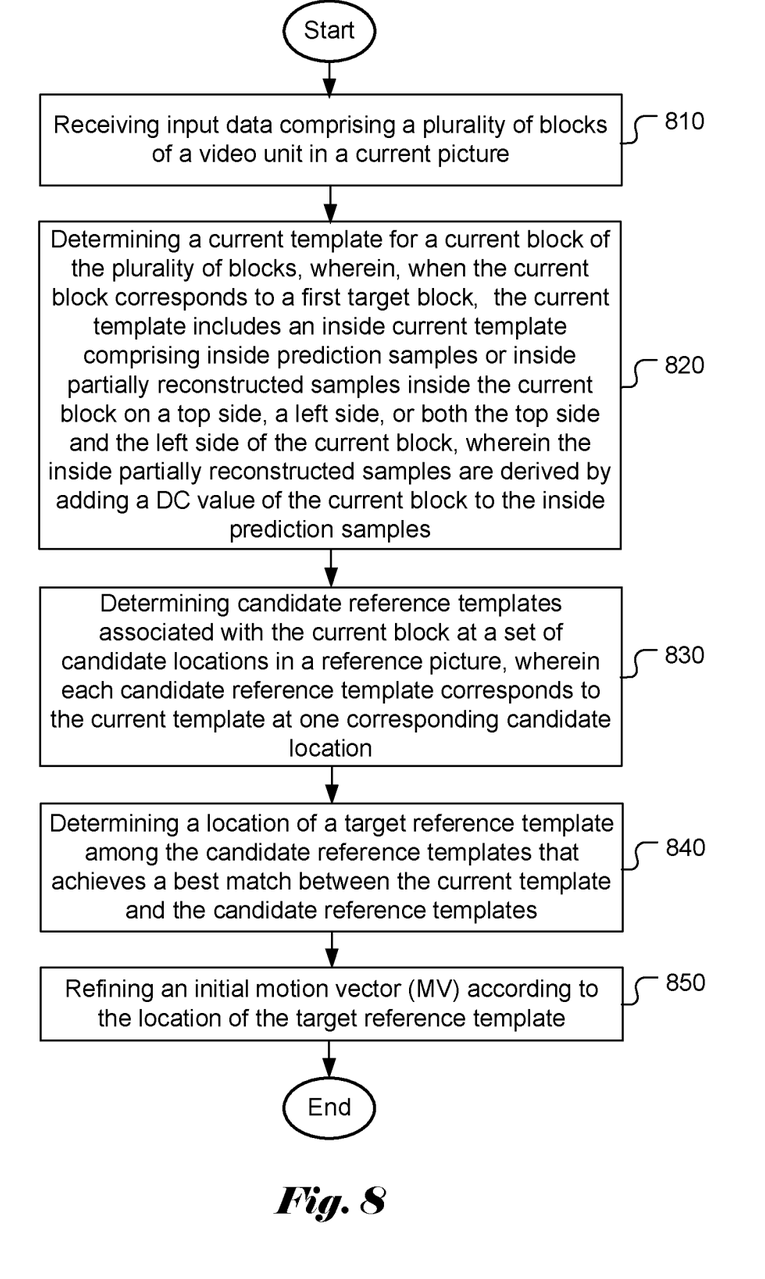
FIG. 8 illustrates a flowchart of an exemplary video coding system that utilizes template matching according to an embodiment of the present invention, where the template includes an inside template.

FIG. 8 illustrates a flowchart of an exemplary video coding system that utilizes template matching according to an embodiment of the present invention, where the template includes an inside template. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data comprising a plurality of blocks of a video unit in a current picture are received in step 810. A current template for a current block of the plurality of blocks is determined in step 820, where, when the current block corresponds to a first target block, the current template includes an inside current template comprising inside prediction samples or inside partially reconstructed samples inside the current block on a top side, a left side, or both the top side and the left side of the current block. The inside partially reconstructed samples are derived by adding a DC value of the current block to the inside prediction samples. Candidate reference templates associated with the current block at a set of candidate locations in a reference picture are determined in step 830, where each candidate reference template corresponds to the current template at one corresponding candidate location. A location of a target reference template among the candidate reference templates that achieves a best match between the current template and the candidate reference templates is determined in step 840. An initial motion vector (MV) is refined according to the location of the target reference template.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data comprising a plurality of blocks of a video unit in a current picture;
determining a current template for a current block of the plurality of blocks, wherein, when the current block corresponds to a first target block, the current template includes an inside current template comprising inside prediction samples or inside partially reconstructed samples inside the current block on a top side, a left side, or both the top side and the left side of the current block, wherein the inside partially reconstructed samples are derived by adding a DC value of the current block to the inside prediction samples;
determining candidate reference templates associated with the current block at a set of candidate locations in a reference picture, wherein each candidate reference template corresponds to the current template at one corresponding candidate location;
determining a location of a target reference template among the candidate reference templates that achieves a best match between the current template and the candidate reference templates; and
refining an initial motion vector (MV) according to the location of the target reference template.

2. The method of claim 1, wherein the inside prediction samples are obtained from the reference picture according to the initial MV and a current location of the current block.

3. The method of claim 1, wherein the first target block corresponds to one of the plurality of blocks that has at least one neighbouring block with reconstructed samples not fully available.

4. The method of claim 1, wherein, when the current block corresponds to a second target block, the current template includes an outside current template comprising outside reconstructed samples outside the current block on the top side, the left side, or both the top side and the left side of the current block.

5. The method of claim 4, wherein the current block is designated as the first target block or the second target block depending on a condition.

6. The method of claim 5, wherein the condition corresponds to that the current block has at least one neighbouring block with reconstructed samples not fully available, and the current block is designated as the first target block if the condition is satisfied; and otherwise, the current block is designated as the second target block.

7. The method of claim 4, wherein, when the current block corresponds to the second target block, the current template corresponds to the outside current template.

8. The method of claim 4, wherein, when the current block corresponds to the second target block, the current template corresponds to a combination of the inside current template and the outside current template.

9. The method of claim 1, wherein the first target block corresponds to one of the plurality of blocks that has one latest reconstructed neighbouring block.

10. The method of claim 1, wherein, when the current block corresponds to the first target block, said each candidate reference template includes an inside candidate reference template corresponding to the inside current template at said one corresponding candidate location.

11. The method of claim 10, wherein said each candidate reference template is processed by a low-pass filter.

12. The method of claim 10, wherein the current template further includes an outside current template comprising outside samples outside the current block on the top side, the left side, or both the top side and the left side of the current block.

13. The method of claim 12, wherein the outside samples correspond to prediction samples outside the current block.

14. The method of claim 12, wherein said each candidate reference template includes an outside candidate reference template corresponding to the outside current template at said one corresponding candidate location.

15. The method of claim 14, wherein a matching error or cost between the current template and one candidate reference template is determined according to an outside matching error or cost between the outside current template and the outside candidate reference template and an inside matching error or cost between the inside current template and the inside candidate reference template.

16. The method of claim 15, wherein the matching error or cost corresponds to a weighted sum of the outside matching error or cost and the inside matching error or cost.

17. The method of claim 16, wherein one or more weights for the weighted sum are dependent on a prediction mode, block size or partition type of the current block.

18. The method of claim 1, wherein the current template excludes the inside current template if a neighbouring block of the current block uses MTS (Multiple Transform Selection) coding tool.

19. The method of claim 1, wherein the DC value is derived as an average of prediction samples of the current block.

20. The method of claim 1, wherein when one or more current samples in the current template are Intra mode, missing samples are generated by padding.

21. An apparatus of video coding, the apparatus comprising one or more electronic circuits or processors arranged to:
receive input data comprising a plurality of blocks of a video unit in a current picture;
determine a current template for a current block of the plurality of blocks, wherein, when the current block corresponds to a first target block, the current template includes an inside current template comprising inside prediction samples or inside partially reconstructed samples inside the current block on a top side, a left side, or both the top side and the left side of the current block, wherein the inside partially reconstructed samples are derived by adding a DC value of the current block to the inside prediction samples;
determine candidate reference templates associated with the current block at a set of candidate locations in a reference picture, wherein each candidate reference template corresponds to the current template at one corresponding candidate location;

determine a location of a target reference template among the candidate reference templates that achieves a best match between the current template and the candidate reference templates; and refine an initial motion vector (MV) according to the location of the target reference template.

\* \* \* \* \*